United States Patent [19]
Hill

[11] Patent Number: 6,160,482
[45] Date of Patent: Dec. 12, 2000

[54] TUB ALARM APPARATUS

[76] Inventor: Timothy W. Hill, 5740 Langley Cir., Pensacola, Fla. 32504

[21] Appl. No.: 09/255,488

[22] Filed: Feb. 23, 1999

Related U.S. Application Data

[60] Provisional application No. 60/076,232, Feb. 27, 1998.

[51] Int. Cl.[7] .................................................. G08B 21/00
[52] U.S. Cl. .......................... 340/625; 340/618; 340/623; 73/308; 200/84 A; 200/61.2
[58] Field of Search .................. 340/618, 623, 340/625; 73/305, 308; 200/84 A, 61.2, DIG. 41

[56] References Cited

U.S. PATENT DOCUMENTS

| | | | |
|---|---|---|---|
| 4,258,444 | 3/1981 | Orszullok | 73/304 C |
| 4,757,305 | 7/1988 | Peso | 340/624 |
| 4,771,272 | 9/1988 | Barnes | 340/624 |
| 5,006,834 | 4/1991 | Fountain | 340/623 |
| 5,053,751 | 10/1991 | Gould | 340/623 |
| 5,294,917 | 3/1994 | Wilkins | 340/623 |
| 5,661,462 | 8/1997 | Shrewsbury-Gee | 340/618 |
| 5,894,611 | 4/1999 | Toro | 340/616 |
| 6,008,728 | 12/1999 | Wesey | 340/618 |

Primary Examiner—Daniel J. Wu

[57] ABSTRACT

An alarm apparatus is provided for a bathtub and includes a suction cup for attaching to a wall of the bathtub. An alarm housing is attached to a top portion of the suction cup. An alarm system is housed within the alarm housing. A float assembly is supported by the alarm housing for activating the alarm system. To use the alarm apparatus of the invention in a bathtub, the suction cup is applied to a wall of the bathtub approximately at a desired height on the wall. Water is added to the bathtub, and when the water level lifts the float assembly a sufficient amount, the alarm system is activated and sounds a warning alarm. The alarm system includes a battery power source, a sounder assembly electrically connected to the battery power source, a manually operated on-off switch assembly electrically connected to the sounder assembly, and a pair of float-responsive switch contacts. The battery power source, the sounder assembly, the manually operated on-off switch assembly, and the float-responsive switch contacts are electrically connected in a series circuit. The float assembly includes a float-controlled switch element which contacts the float-responsive switch contacts when water in the bathtub reaches a predetermined level for closing a series circuit. A liquid-level-responsive control assembly is provided for operating the float-controlled switch element.

8 Claims, 3 Drawing Sheets

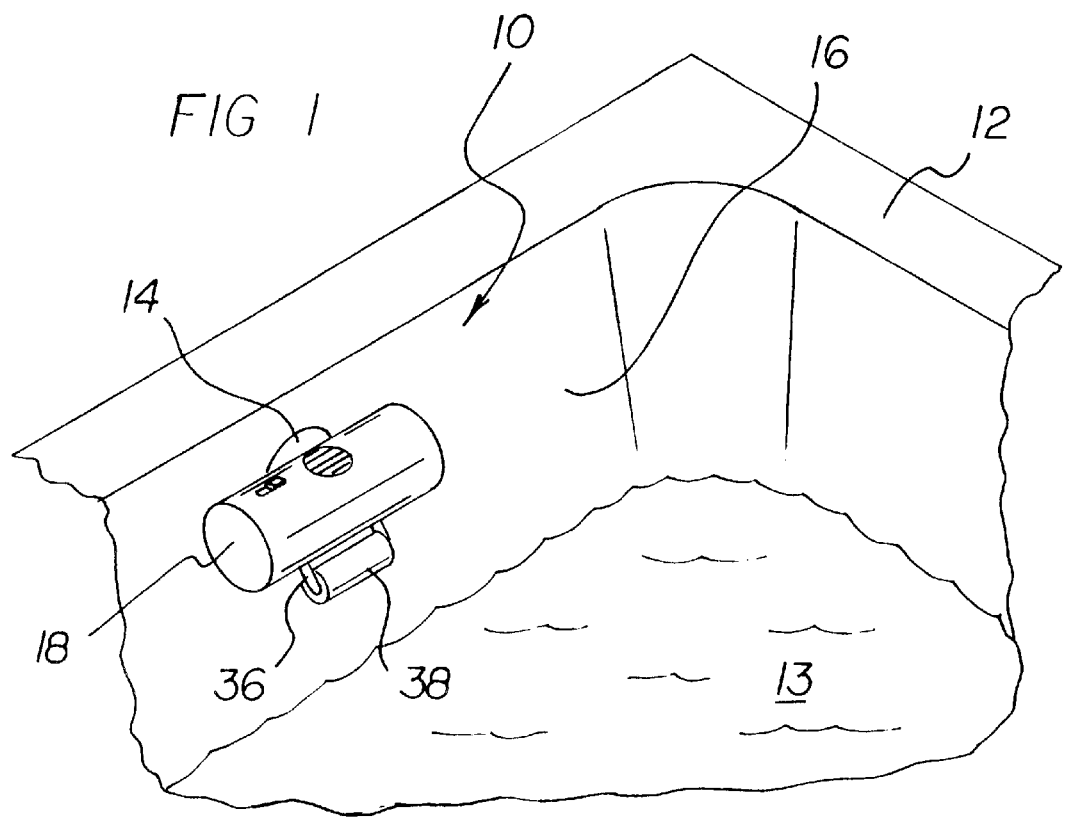
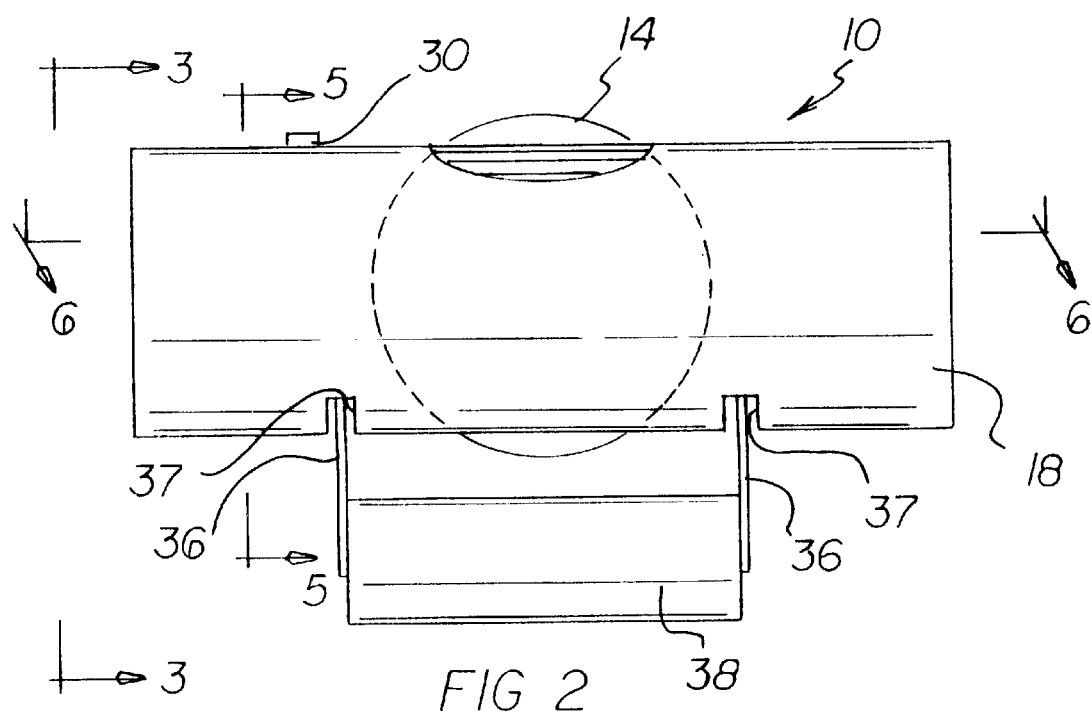

TUB ALARM APPARATUS

CROSS-REFERENCE TO RELATED APPLICATION

This application claims priority based upon my prior copending Provisional Application Ser. No. 60/076,232, filed Feb. 27, 1998.

BACKGROUND OF THE INVENTION

1. Field of the Invention

The present invention relates generally to alarm devices and, more particularly, to an alarm especially adapted for use in a bathtub to prevent an overflow of water from the bathtub.

2. Description of the Prior Art

The potential problem of water overflowing from a bathtub is a well know problem. Extensive and expensive water damage to floors and ceilings can quickly result when a bathtub overflows. One cause of bathtub overflow is inattention to the flow of water into to the bathtub once the water flow has started. It is easy to be distracted and forget about the water flow. In this respect, throughout the years, a number of innovations have been developed relating to alarms to warn of a undesirably high water level in a bathtub, and the following U.S. patents are representative of some of those innovations: U.S. Pat. Nos. 4,258,444, 4,757,305, 4,771,272, 5,053,751, and 5,294,917.

More specifically, in U.S. Pat. No. 4,258,444, a substantial portion of the device is located outside an interior wall of the bathtub and extends down to the floor which supports the bathtub. Such a positioning may take up floor space. that is important for supporting a person who is ready to step into the bathtub or who steps out from the bathtub. Moreover, with this device, a portion of the device extends through a hole in a bathtub wall. To avoid the need for making a hole in a bathtub wall, and to avoid the possibility that water would leak out through a hole in the bathtub wall, it would be desirable if a bathtub alarm device which does not require a hole in the bathtub wall.

It is noted that in each of U.S. Pat. Nos. 4,757,305, 4,771,272, and 5,294,917, a substantial portion of the device is immersed in the water of the bathtub long before an undesirable water level is reached in the bathtub. As a result, substantial portions of such devices repetitively are exposed to water, even when undesirable water levels are not reached. With such repetitive exposure to bathtub water, such devices require considerable cleaning and drying, especially to avoid the growth of undesirable mold. In this respect, it would be desirable if a water alarm device for a bathtub were provided which does not have substantial portions of the device immersed in bathtub water when undesirable water levels have not been reached.

In U.S. Pat. No. 5,053,751 a water alarm to signal flooding in basements is disclosed in which a float unit is separated by a considerable distance from an alarm unit. The float and alarm units are connected together by conductors having considerable length. To provide for a compact bathtub alarm unit, it would be desirable if a tub alarm apparatus included a water float that were connected directly to an alarm unit.

Still other features would be desirable in a tub alarm apparatus. For example, a wall of a bathtub is generally nonporous and smooth. Generally, it is known that suction cup supports can be used with nonporous and smooth surfaces. In this respect, it would be desirable if a tub alarm apparatus were provided with a suction cup support for supporting the apparatus on a wall of a bathtub.

Thus, while the foregoing body of prior art indicates it to be well known to use an alarm to signal an undesirable level of water in a bathtub, the prior art described above does not teach or suggest a tub alarm apparatus which has the following combination of desirable features: (1) does not take up floor space adjacent to the bathtub; (2) does not require a hole to be located in a bathtub wall; (3) does not have substantial portions of the device immersed in bathtub water prior to the water level reaching an undesirable level in the bathtub; (4) includes a water float that is connected directly to an alarm unit; and (5) employs a suction cup support for supporting the apparatus on a wall of a bathtub. The foregoing desired characteristics are provided by the unique tub alarm apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an alarm apparatus for a liquid container and includes a suction cup for attaching to a wall of the liquid container. An alarm housing is attached to a top portion of the suction cup. An alarm system is housed within the alarm housing. A float assembly is supported by the alarm housing for activating the alarm system. Preferably, the liquid container is a bathtub. To use the alarm apparatus of the invention in a bathtub, the apparatus is carried to the bathtub, and the suction cup is applied to a wall of the bathtub approximately at a desired height on the wall. Water is added to the bathtub, and when the water level lifts the float assembly a sufficient amount, the alarm system is activated and sounds a warning alarm.

The alarm system includes a battery power source, a sounder assembly electrically connected to the battery power source, a manually operated on-off switch assembly electrically connected to the sounder assembly, and a pair of float-responsive switch contacts. One of the float-responsive switch contacts is electrically connected to the manually operated on-off switch assembly, and the other of the float-responsive switch contacts is electrically connected to the battery power source. The battery power source, the sounder assembly, the manually operated on-off switch assembly, and the float-responsive switch contacts are electrically connected in a series circuit.

The float assembly includes a float-controlled switch element which contacts the float-responsive switch contacts when water in the bathtub reaches a predetermined level for closing a series circuit. A liquid-level-responsive control assembly is provided for operating the float-controlled switch element.

The liquid-level-responsive control assembly includes float pivots supported by the alarm housing, float support arms pivotally connected to the float pivots, and a flotation member supported by the float support arms.

The float-controlled switch element is an electrically conductive strip that is supported by the float support arms. The electrically conductive strip includes conductive bumps which contact the float-responsive switch contacts. The alarm housing includes an interior, water tight chamber which is defined by an interior floor portion. The float pivots are supported by struts which extend downward from the interior floor portion. The alarm housing includes arm slots which permit free movement of the float support arms.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tub alarm apparatus which has all of the advantages of the prior art and none of the disadvantages.

It is another object of the present invention to provide a new and improved tub alarm apparatus which may be easily and efficiently manufactured and marketed.

It is a further object of the present invention to provide a new and improved tub alarm apparatus which is of durable and reliable construction.

An even further object of the present invention is to provide a new and improved tub alarm apparatus which is susceptible of a low cost of manufacture with regard to both materials and labor, and which accordingly is then susceptible of low prices of sale to the consuming public, thereby making such tub alarm apparatus available to the buying public.

Still yet a further object of the present invention is to provide a new and improved tub alarm apparatus which does not take up floor space adjacent to the bathtub.

Still another object of the present invention is to provide a new and improved tub alarm apparatus that does not require a hole to be located in a bathtub wall.

Yet another object of the present invention is to provide a new and improved tub alarm apparatus which does not have substantial portions of the device immersed in bathtub water prior to the water level reaching an undesirable level in the bathtub.

Even another object of the present invention is to provide a new and improved tub alarm apparatus that includes a water float that is connected directly to an alarm unit.

Still a further object of the present invention is to provide a new and improved tub alarm apparatus which employs a suction cup support for supporting the apparatus on a wall of a bathtub.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the tub alarm apparatus of the invention installed on a wall of a bathtub.

FIG. 2 is an enlarged front view of the embodiment of the tub alarm apparatus shown in FIG. 1.

DESCRIPTION OF THE PREFERRED EMBODIMENT

Figure 3:
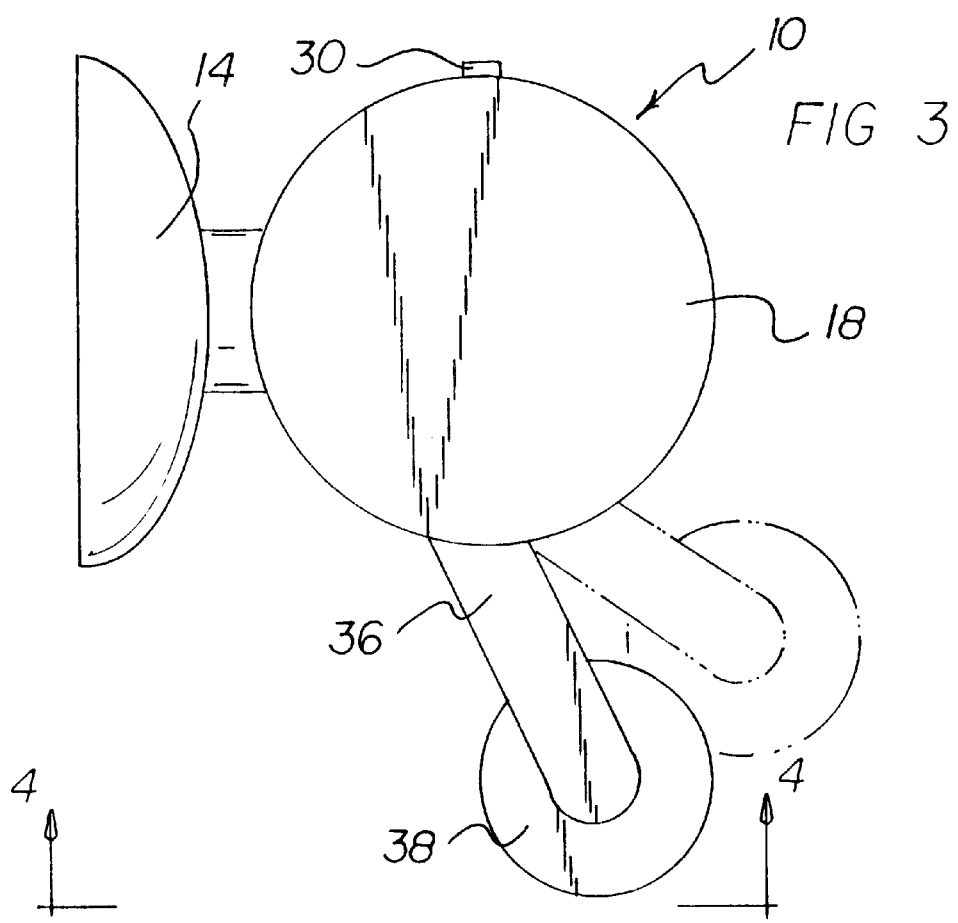
FIG. 3 is an enlarged side view of the embodiment of the tub alarm apparatus of FIG. 2 taken along line 3—3 thereof.

With reference to the drawings, a new and improved tub alarm apparatus embodying the principles and concepts of the present invention will be described.

Turning to FIGS. 1–6, there is shown an exemplary embodiment of the tub alarm apparatus of the invention generally designated by reference numeral 10. In its preferred form, tub alarm apparatus 10 is provided for a liquid container and includes a suction cup 14 for attaching to a wall 16 of the liquid container. An alarm housing 18 is attached to a top portion of the suction cup 14. An alarm system is housed within the alarm housing 18. A float assembly is supported by the alarm housing 18 for activating the alarm system. Preferably, the liquid container is a bathtub 12. To use the alarm apparatus 10 of the invention in a bathtub 12, the apparatus is carried to the bathtub 12, and the suction cup 14 is applied to a wall 16 of the bathtub 12 approximately at a desired height on the wall 16. Water 13 is added to the bathtub 12, and when the water level lifts the float assembly a sufficient amount, the alarm system is activated and sounds a warning alarm.

The alarm system includes a battery power source 20, a sounder assembly 22 electrically connected to the battery power source 20, a manually operated on-off switch assembly 30 electrically connected to the sounder assembly 22, and a pair of float-responsive switch contacts 52. One of the float-responsive switch contacts 52 is electrically connected to the manually operated on-off switch assembly 30, and the other of the float-responsive switch contacts 52 is electrically connected to the battery power source 20. The battery power source 20, the sounder assembly 22, the manually operated on-off switch assembly 30, and the float-responsive switch contacts 52 are electrically connected in a series circuit.

The float assembly includes a float-controlled switch element 40 which contacts the float-responsive switch contacts 52 when water in the bathtub 12 reaches a predetermined level for closing a series circuit. A liquid-level-responsive control assembly is provided for operating the float-controlled switch element 40.

The liquid-level-responsive control assembly includes float pivots 34 supported by the alarm housing 18, float support arms 36 pivotally connected to the float pivots 34, and a flotation member 38 supported by the float support arms 36.

The float-controlled switch element 40 is an electrically conductive strip 40 that is supported by the float support arms 36. The electrically conductive strip 40 includes conductive bumps 41 which contact the float-responsive switch contacts 52. The alarm housing 18 includes an interior, water tight chamber 46 which is defined by an interior floor portion 48. The float pivots 34 are supported by struts 35 which extend downward from the interior floor portion 48. The alarm housing 18 includes arm slots 37 which permit free movement of the float support arms 36.

Figure 4:
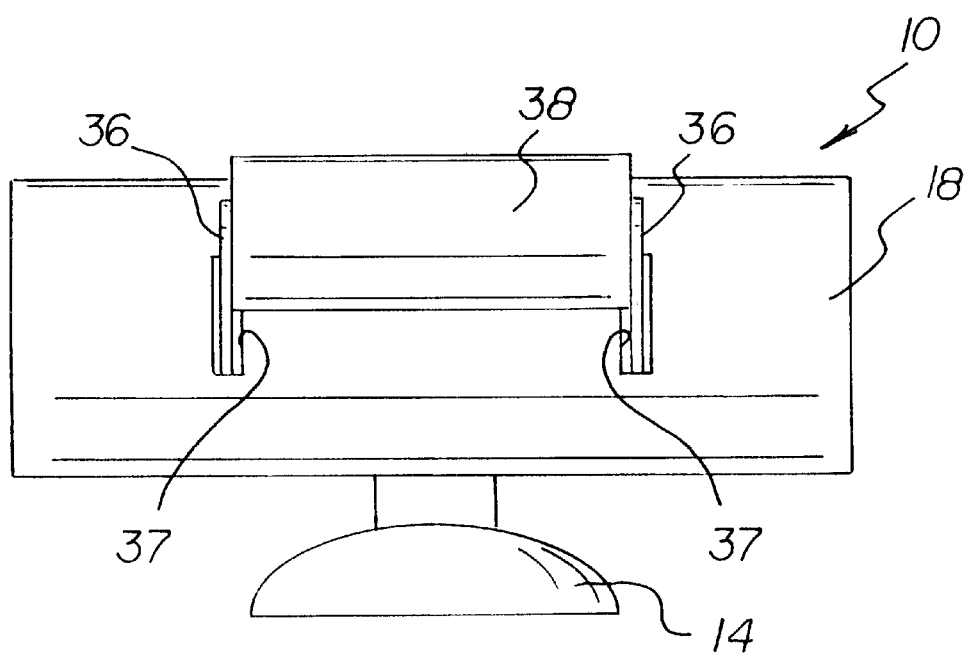
FIG. 4 is a bottom view of the embodiment of the invention shown in FIG. 2.
Figure 5:
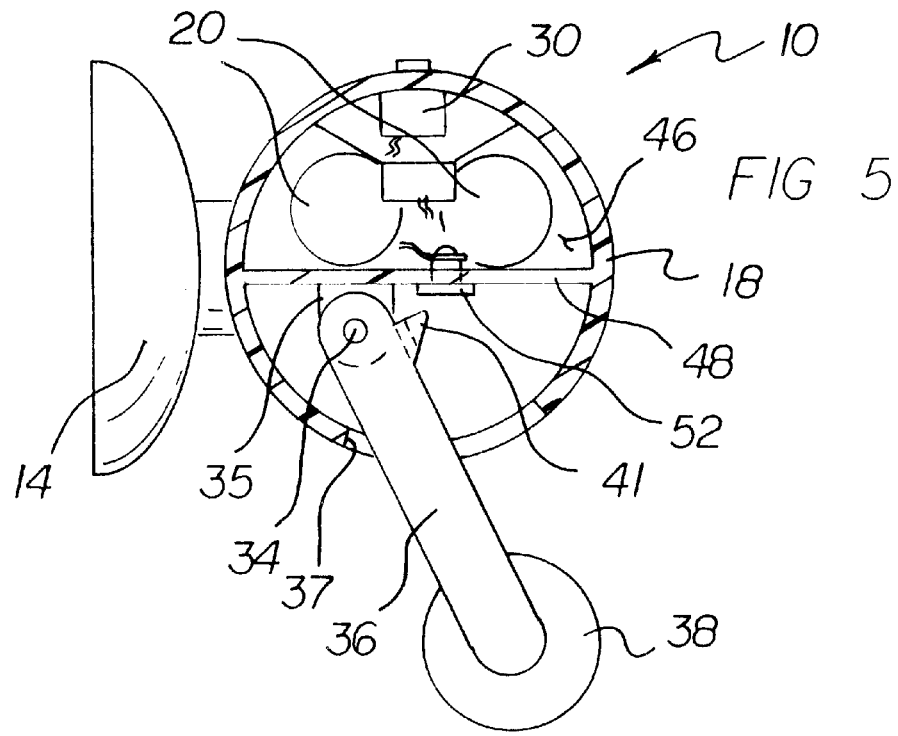
FIG. 5 is a cross-sectional view of the embodiment of the invention shown in FIG. 2 taken along line 5—5 thereof.
Figure 6:
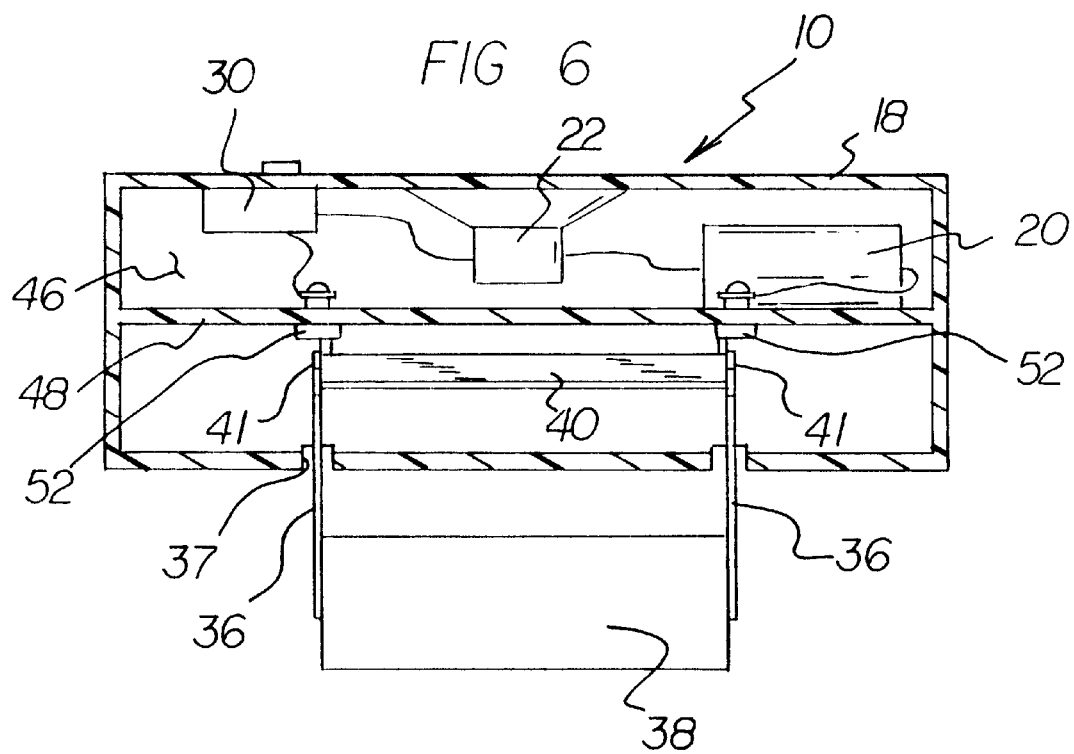
FIG. 6 is a cross-sectional view of the embodiment of the invention shown in FIG. 2 taken along line 6—6 thereof.

To use the alarm apparatus 10 of the invention in a bathtub 12, a desired water fill level for the bathtub 12 is first determined. Then, the suction cup 14 is attached to the wall 16 at a height which is in accordance with the predetermined water fill level. The manually operated on-off switch assembly 30 is switched to the "on" position so that a series circuit is provided by the battery power source 20, the sounder assembly 22, the manually operated on-off switch assembly 30, and the float-responsive switch contacts 52. As long as the water level in the bathtub 12 is sufficiently low, the conductive bumps 41 of the electrically conductive strip 40 are not in electrical contact with the float-responsive switch contacts 52, and the circuit remains as an open circuit. In the open circuit status, the sounder assembly 22 is not activated, and the alarm apparatus 10 is quiet. The position of the flotation member 38 before the water level causes the flotation member 38 to float on the water is shown in FIGS. 1, 2, and 4, and the flotation member 38 and the float support arms 36 are shown in solid lines in FIG. 3.

However, as the water level rises in the bathtub 12, the water level will eventually cause the flotation member 38 to float on the rising water. When the water level is sufficiently high in the bathtub 12, the flotation member 38 and the float support arms 36 are in the position shown in the broken lines in FIG. 3. In this position, the conductive bumps 41 of the electrically conductive strip 40 are in contact with the float-responsive switch contacts 52, and the circuit is closed. As a result, the sounder assembly 22 is energized, and the sounder assembly 22 emits an audible alarm signal which warns that the water level in the bathtub 12 has reached the predetermined level. The audible alarm signal alerts a nearby person that the water level in the bathtub 12 is at the desired level and that, without intervention, the bathtub 12 will overflow in due course.

When the person turns the manually operated on-off switch assembly 30 to the "off" position, the circuit is opened once again, and the sounder assembly 22 ceases emitting an audible signal. To remove the alarm apparatus 10 from the bathtub 12, the suction cup 14 is simply disconnected from the wall 16.

The components of the tub alarm apparatus of the invention can be made from inexpensive and durable metal and plastic materials and electrical components.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tub alarm apparatus that is low in cost, relatively simple in design and operation, and which may advantageously be used without taking up floor space adjacent to the bathtub. With the invention, a tub alarm apparatus is provided which does not require a hole to be located in a bathtub wall. With the invention, a tub alarm apparatus is provided which does not have substantial portions of the device immersed in bathtub water prior to the water level reaching an undesirable level in the bathtub. With the invention, a tub alarm apparatus is provided which includes a water float that is connected directly to an alarm unit. With the invention, a tub alarm apparatus is provided which employs a suction cup support for supporting the apparatus on a wall of a bathtub.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An alarm apparatus for a liquid container, comprising:
    a suction cup for attaching to a wall of the liquid container,
    an alarm housing attached to a top portion of said suction cup, and
    an alarm system housed within said alarm housing,
    a float assembly supported by said alarm housing for activating said alarm system,
    wherein said alarm system includes:
        a battery power source,
        a sounder assembly electrically connected to said battery power source,
        a manually operated on-off switch assembly electrically connected to said sounder assembly, and
        a pair of float-responsive switch contacts, wherein one of said float-responsive switch contacts is electrically connected to said manually operated on-off switch assembly, and wherein another of said float-responsive switch contacts is electrically connected to said battery power source,
        wherein said battery power source, said sounder assembly, said manually operated on-off switch assembly, and said float-responsive switch contacts are electrically connected in a series circuit.

2. The apparatus of claim 1 wherein said liquid container is a bathtub.

3. The apparatus of claim 1 wherein said float assembly includes:
- a float-controlled switch element which contacts said float-responsive switch contacts when liquid in said bathtub reaches a predetermined level for closing a series circuit,
- a liquid-level-responsive control assembly for operating said float-controlled switch element.

4. The apparatus of claim 3 wherein said liquid-level-responsive control assembly includes:
- float pivots supported by said alarm housing,
- float support arms pivotally connected to said float pivots,
- a flotation member supported by said float support arms.

5. The apparatus of claim 4 wherein said float-controlled switch element is an electrically conductive strip that is supported by said float support arms, wherein said electrically conductive strip includes conductive bumps which contact said float-responsive switch contacts.

6. The apparatus of claim 4 wherein said alarm housing includes arm slots which permit free movement of said float support arms.

7. The apparatus of claim 4 wherein said alarm housing includes an interior, water tight chamber which is defined by an interior floor portion.

8. The apparatus of claim 7 wherein said float pivots are supported by struts which extend downward from said interior floor portion.

* * * * *